(12) United States Patent
Roy et al.

(10) Patent No.: US 7,992,347 B2
(45) Date of Patent: Aug. 9, 2011

(54) STRUCTURAL DOOR MODULE

(75) Inventors: Pierre-Xavier Roy, Toronto (CA);
Douglas G. Broadhead, Brampton (CA); Ed Fortin, Newmarket (CA);
Traian Miu, Mississauga (CA)

(73) Assignee: Intier Automotive Closures Inc,
Newmarket, Ontario (CA)

( * ) Notice: Subject to any disclaimer, the term of this patent is extended or adjusted under 35 U.S.C. 154(b) by 791 days.

(21) Appl. No.: 11/629,426

(22) PCT Filed: Jun. 21, 2005

(86) PCT No.: PCT/CA2005/000956
§ 371 (c)(1),
(2), (4) Date: Dec. 13, 2006

(87) PCT Pub. No.: WO2006/000082
PCT Pub. Date: Jan. 5, 2006

(65) Prior Publication Data
US 2008/0276541 A1 Nov. 13, 2008

Related U.S. Application Data

(60) Provisional application No. 60/582,300, filed on Jun. 23, 2004.

(51) Int. Cl.
*B60J 5/04* (2006.01)
(52) U.S. Cl. ............ 49/502; 296/146.7
(58) Field of Classification Search ........ 49/502, 49/394, 349, 348; 296/146.7, 146.5
See application file for complete search history.

(56) References Cited

U.S. PATENT DOCUMENTS

| | | | | |
|---|---|---|---|---|
| 3,989,275 A * | 11/1976 | Finch et al. | ........ | 280/751 |
| 4,662,115 A * | 5/1987 | Ohya et al. | ........ | 49/502 |
| 4,957,803 A * | 9/1990 | Foley | ........ | 428/182 |
| 5,040,335 A * | 8/1991 | Grimes | ........ | 49/502 |
| 5,050,350 A * | 9/1991 | Bertolini et al. | ........ | 49/502 |
| 5,251,403 A * | 10/1993 | Compeau et al. | ........ | 49/502 |
| 5,367,832 A * | 11/1994 | Compeau et al. | ........ | 49/502 |
| 5,531,499 A * | 7/1996 | Vecchio et al. | ........ | 296/146.7 |
| 5,535,553 A | 7/1996 | Staser et al. | | |
| 5,584,144 A * | 12/1996 | Hisano | ........ | 49/502 |
| 5,927,020 A * | 7/1999 | Kobrehel | ........ | 49/502 |
| 6,571,515 B1 | 6/2003 | Samways et al. | | |
| 2003/0097798 A1 | 5/2003 | Staser | | |
| 2003/0218356 A1 | 11/2003 | Emerling et al. | | |

FOREIGN PATENT DOCUMENTS

EP 1 129 874 A2 5/2001

OTHER PUBLICATIONS

International Search Report for PCT/CA2005/000956 dated Oct. 6, 2005.

* cited by examiner

*Primary Examiner* — Jerry Redman
*Assistant Examiner* — Catherine A Kelly
(74) *Attorney, Agent, or Firm* — Miller Canfield (57) ABSTRACT

A structural door module for a motor vehicle door, comprising of a carrier plate with a plurality of door hardware components mounted to the dryside and wetside surfaces of the carrier plate. The carrier plate includes a number of preformed components that allow door subsystems to be pre-mounted to the door module and tested prior to mounting the structural door module in the motor vehicle door body. An energy absorbing area is molded into the carrier plate. Additionally, a protruding arm rest support is designed to collapse during a side-impact collision.

6 Claims, 14 Drawing Sheets

STRUCTURAL DOOR MODULE

RELATED APPLICATIONS:

This application is a §371 of PCT/CA2005/000956, filed on Jun. 21, 2005, which claims priority to and all the benefits of U.S. Provisional Application No. 60/582,300 filed on Jun. 23, 2004.

FIELD OF THE INVENTION

The present invention relates to a module for a motor vehicle door body. More particularly, the present invention relates to a structural module that both strengthens the motor vehicle door body and acts as a hardware carrier for hardware subsystems in order to minimize subsequent assembly operations.

BACKGROUND OF THE INVENTION

A motor vehicle door typically includes an outer sheet metal panel, an inner sheet metal panel, and a plurality of hardware components mounted within an inner cavity formed between the outer and inner sheet metal panels. Common hardware components mounted to a door body include inner and outer door handle assemblies, window regulators, latch assemblies and speaker assemblies, along with their ancillary connecting and electrical components. The complete assembly of the door involves multiple manufacturing steps and numerous parts. Conventionally, an original equipment manufacturer (OEM) will install each individual hardware component to the structural door body along an assembly line.

In general, vehicle occupants are less protected against side-impact collisions than front or rear-end collisions due to the relative thinness of the motor vehicle door. The door body itself can be forced into the passenger compartment, since the door body typically absorbs only a limited portion of the collision energy. Additionally, rigid hardware components that are mounted between the outer and inner sheet metal panels can also be forced into the passenger compartment. To improve safety in side-impact collisions, the vehicle door is typically reinforced by strengthening the sheet metal panels, or by mounting reinforcing structures such as crash beams to the door body. Additionally, one or more energy absorbing foam blocks are typically mounted between the inner and outer sheet metal panels to reduce the severity of a side-impact collision.

The conventional installation of the hardware and safety components has, however, several drawbacks. First, a high assembly cycle is required to assemble the door in this fashion since installation of each hardware and safety component is a separate task requiring human effort. Hardware components must be mounted to the door body and then interconnected. Second, operability of the hardware components cannot be determined until the respective components are installed onto the door. Thus, time and labor may be wasted installing inoperable or ill-fitted components. Finally, additional time is required to inventory each hardware component as it arrives at the OEM to ensure that all of the hardware components are available for assembly.

Pre-assembled door modules have been proposed to overcome some of the deficiencies of conventional door assembly methods. A door module typically involves using a carrier plate to partially assembly and orientate hardware components thereto prior to installation to the structural door body. One disadvantage associated with such door modules is that once the door module is installed to the door, the carrier body typically serves little or no purpose since all of the hardware components are eventually securely fastened to the structural door body and the door module itself does little or nothing to strengthen the door body. Another disadvantage associated with such door modules is that the door modules themselves are very labour intensive and require a large number of parts and steps to assemble before they can be delivered to the OEM.

It is therefore desired to provide a door module that adds structural support to a motor vehicle door body, provides greater protection to passengers, and is easy to assemble at an OEM plant.

SUMMARY OF THE INVENTION

According to a first aspect of the present invention, there is provided a structural door module for a motor vehicle door body. The structural door module includes a carrier plate forming a first and second surface, and a plurality of door hardware components are mounted to at least one of the first and second surface in a pre-configured orientation. The structural door module also includes an arm rest support that is integrally formed from and extends out from the first surface of the structural plate and forms a hollow in the second surface. Preferably, an array of crumple zones are provided around the surface of the arm rest support to minimize the dangers of a side-impact collision.

According to a second aspect of the present invention, there is provided a structural door module for a motor vehicle door body. The structural door module includes a carrier plate forming a first and second surface, and a plurality of door hardware components are mounted to at least one of the first and second surface in a pre-configured orientation. An energy absorption block is integrally formed from the first and second surface of the carrier plate. Preferably, the energy absorbing block is a series of raised and lowered terrace portions arranged concentrically and spaced apart by wall portions of the energy absorbing block.

According to a third aspect of the present invention, there is provided a structural door module for a motor vehicle door body. The structural door module includes a carrier plate forming a first and second surface, and a plurality of door hardware components are mounted to at least one of the first and second surface in a pre-configured orientation. A handle support is integrally formed from the carrier plate. The handle support provides a cavity to receive a door handle assembly on the first surface.

According to a fourth aspect of the present invention, there is provided a structural door module for a motor vehicle door body. The structural door module includes a carrier plate forming a first and second surface, and a plurality of door hardware components are mounted to at least one of the first and second surface in a pre-configured orientation. A drum housing is integrally formed from one of the first and second surface, and includes a shaft passage extending from the first surface to the second surface. A rail is mounted to the same one of the first and second surface as the drum housing and includes a flange that is mounted at least partially over the drum housing. A lift member is slidably mounted on the rail. A motor is mounted to the carrier plate on the surface opposite the drum housing. The motor includes a drive shaft that extends through the shaft passage in the drum housing. A cable drum is housed within the drum housing and is retained there within by the flange on the rail. The cable drum is rotatably mounted to the drive shaft between the carrier plate and the at least one rail.

According to a fifth aspect of the present invention, there is provided a structural door module for a motor vehicle door body. The structural door module includes a carrier plate forming a first and second surface, and a plurality of door hardware components are mounted to at least one of the first and second surface in a pre-configured orientation. A latch presenter is integrally formed from the first surface and a glass guide is integrally formed from the edge of the latch presenter.

According to a sixth aspect of the present invention, there is provided a structural door module for a convertible motor vehicle door body. The structural door module includes a carrier plate forming a first and second surface, and a plurality of door hardware components are mounted to at least one of the first and second surface in a pre-configured orientation. A window regulator is mounted to one of the first and second surface, and includes a first and a second rail. A glass guide channel is mounted to each of the first and second rail. Each of the first and second rail mounted at a first end to the carrier plate. Each rail is provided with an independent rail adjustment means operable to change the displacement of its respective rail and the mounted glass guide channel relative to the carrier plate.

The present invention provides a structural door module for a motor vehicle door body, comprising a carrier plate with a plurality of door hardware components mounted to the dryside and wetside surfaces of the carrier plate. The carrier plate includes a number of preformed components that allow door subsystems to be pre-mounted to the door module and tested prior to mounting the structural door module in the motor vehicle door body. An energy absorbing area is molded into the carrier plate. Additionally, a protruding arm rest support is designed to collapse during a side-impact collision.

A second embodiment provides a structural door module for a convertible vehicle door body, comprising of a carrier plate with a plurality of door hardware components mounted to the dryside and wetside surfaces of the carrier plate. A pair of glass guide channels are mounted to two rails on the window regulator. An integrally formed mirror flag is provided on one of the two glass guide channels. A latch presenter is mounted to the other of the two glass guide channels. Each of the two rails is provided with an independent adjustment means that allows the rail to be moved closer to or farther away from the carrier plate.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

FIGS. 1-8 show a first embodiment of the invention, and FIGS. 9-13 shows a second embodiment of the invention.

Figure 1:
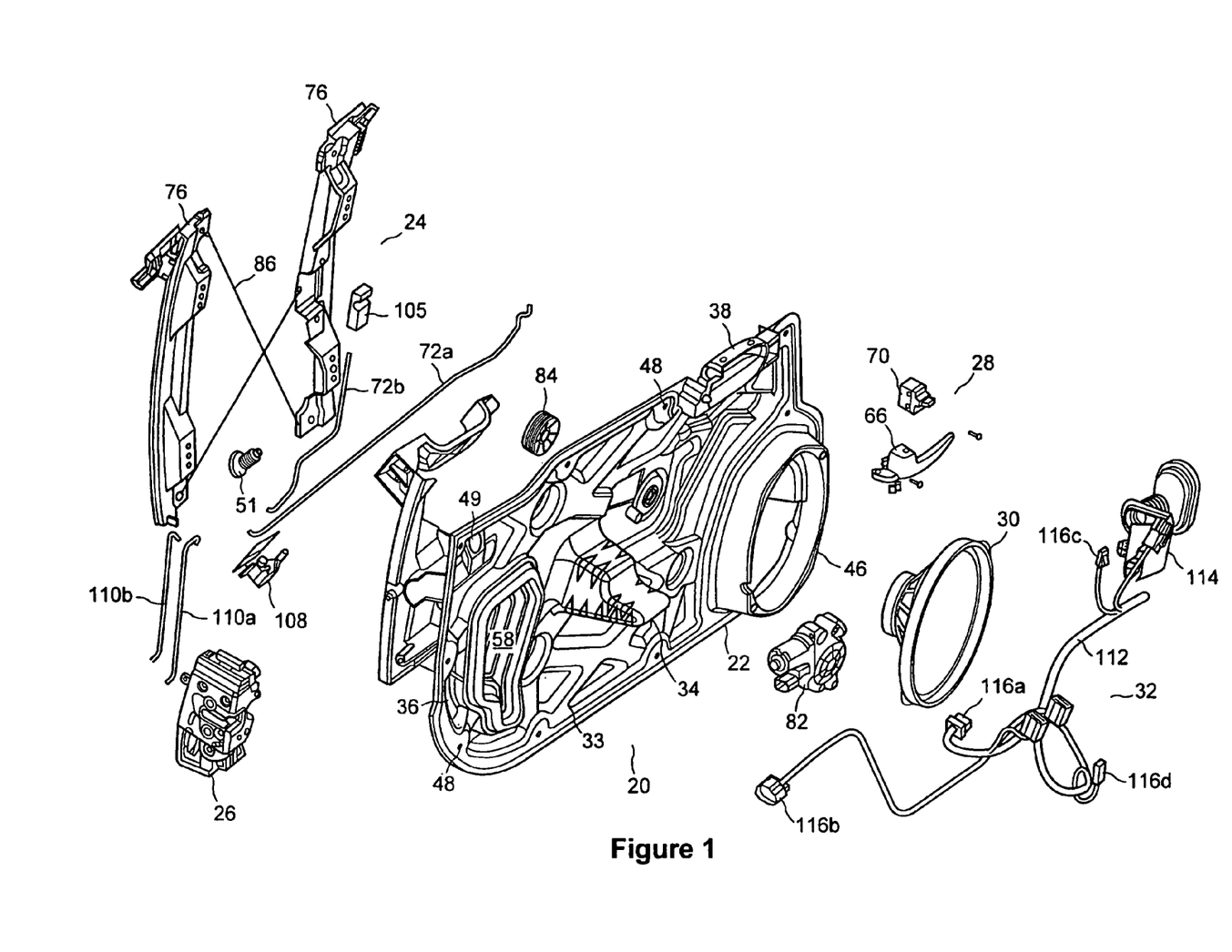
FIG. 1 is an exploded front perspective view of a structural door module according to a first embodiment of the invention.
Figure 2:
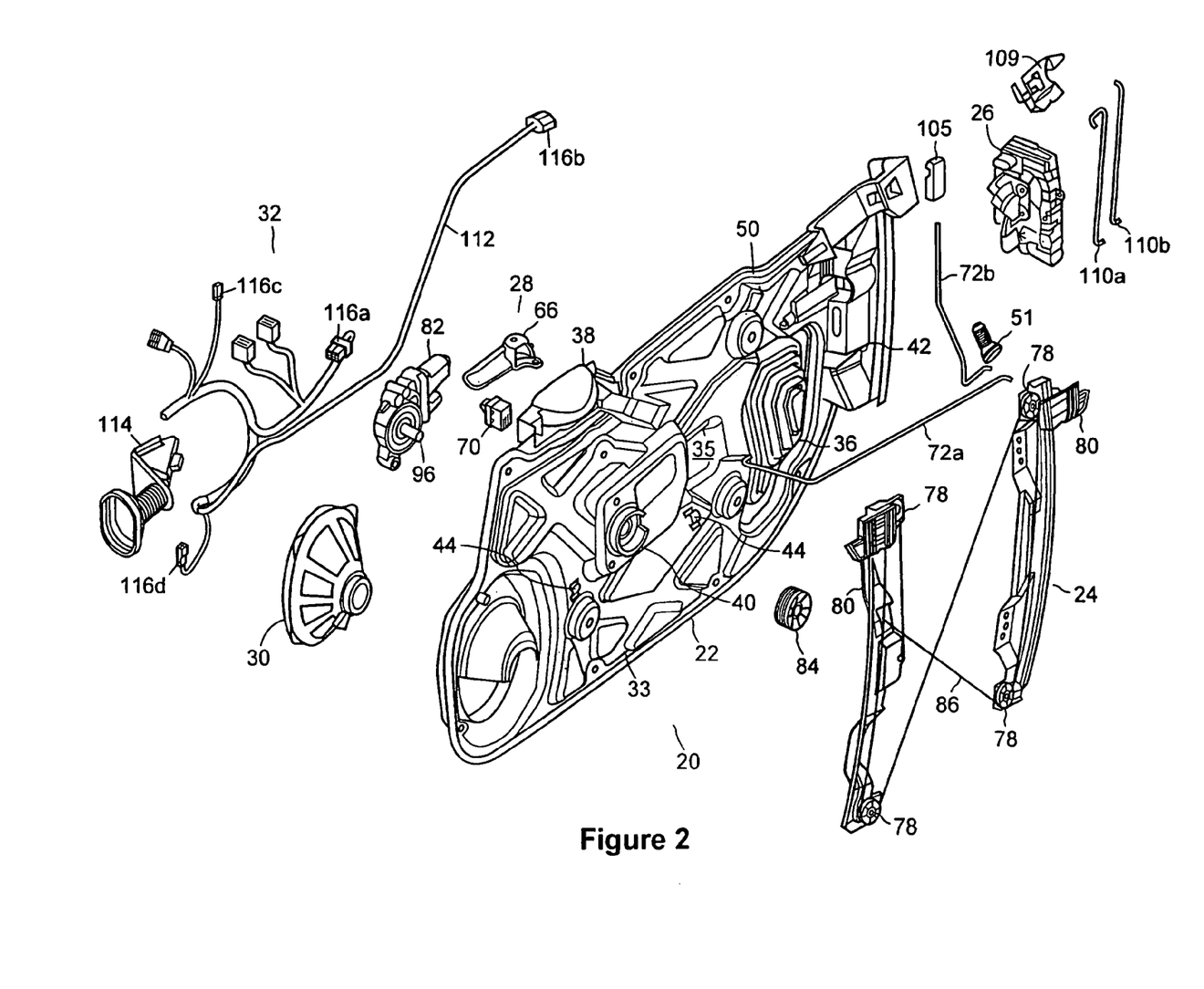
FIG. 2 is an exploded rear perspective view of the structural door module shown in FIG. 1.
Figure 3:
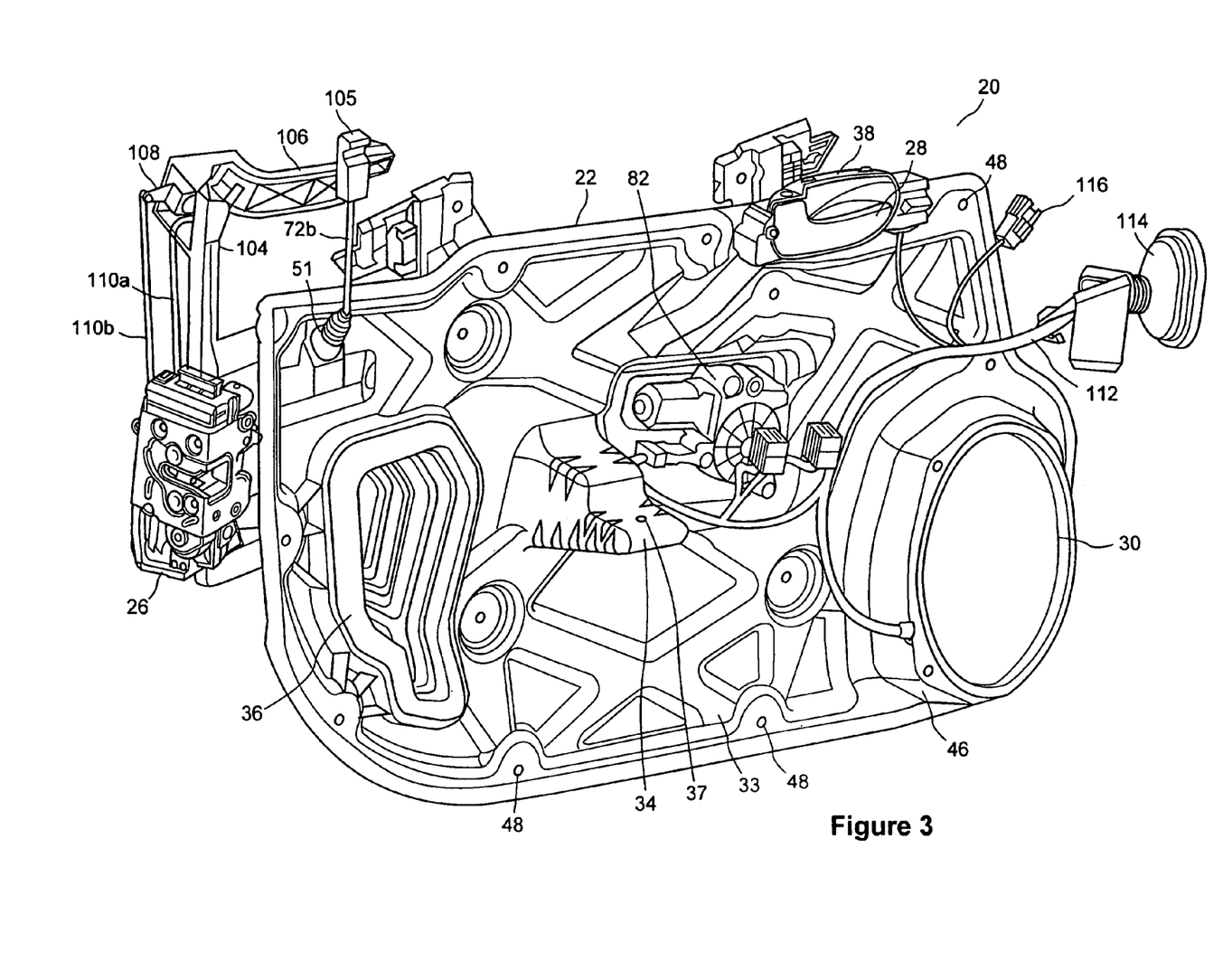
FIG. 3 is a front perspective view of the structural door module shown in FIG. 1.
Figure 4:
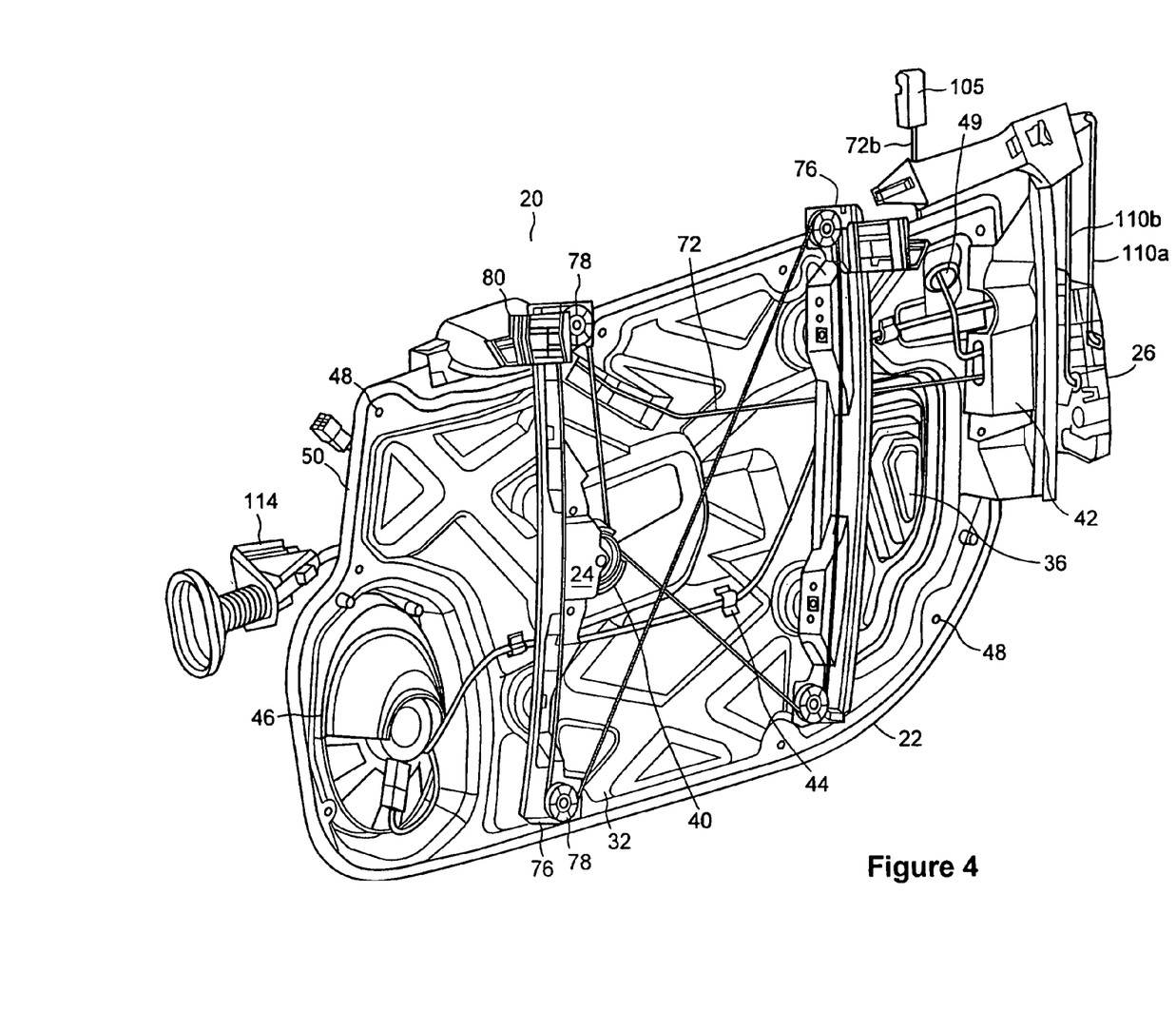
FIG. 4 is a rear perspective view of the structural door module shown in FIG. 2.

FIGS. 1 to 4 show a structural door module 20, which includes a plurality of hardware subsystems mounted to or otherwise integrated with a carrier plate 22, and discussed in greater detail below. FIGS. 1 to 2 show an exploded perspective view of the structural door module 20 and FIGS. 3 to 4 are an assembly view of the structural door module 20. Carrier plate 22 provides opposing first and second surface, hereafter referred to as the "dryside" and "wetside" surfaces respectively. Shown in FIG. 1, the dryside surface of carrier plate 22 faces the interior of the vehicle when mounted to a motor vehicle door body (not shown). Conversely, as shown in FIG. 2, the wetside surface of carrier plate 22 faces the exterior of the vehicle when mounted to a motor vehicle door body (not shown). Hardware subsystems that are typically pre-mounted to carrier plate 22 include a window regulator assembly 24, a latch assembly 26, a handle assembly 28, a speaker assembly 30 and an electrical harness assembly 32.

Carrier plate 22 includes a number of integrally formed or molded components. Integrally formed components on carrier plate 22 include support ribs 33, an integral arm rest support 34, at least one integral energy absorption block 36, an integral inner handle support 38, an integral drum housing 40, an integral latch presenter 42, harness clips 44, and a speaker housing 46. A plurality of fastener holes 48 spaced apart around the surface of carrier plate 22 provide a means to attach structural carrier plate 22 to the motor vehicle door body through the use of carriage bolts, screws or the like. A plurality of access holes 49 are formed in carrier plate 22 to allow passage of articulating rods and electrical cables (both described in greater detail below). Preferably, a water-sealing bead 50 is formed around the perimeter of carrier plate 22 on the wetside surface. The sealing bead 50 engages the inner wall of the motor vehicle door body, providing a watertight seal for structural door module 20. Water sealing bead 50 can be integrally formed from carrier plate 22 or, alternatively, water sealing bead 50 can be affixed to carrier plate 22 as a foam adhesive or the like. Preferably, a sealing gasket 51 is mounted over access holes 49 for additional weather proofing.

Carrier plate 22 is preferably manufactured from a composite material and molded into the desired shape. In the preferred embodiment, carrier plate 22 is manufactured using a 40% polypropylene matrix with glass reinforcement fibers. Other matrix materials will occur to those of skill in the art. Other reinforcement fibers contemplated include Kevlar, carbon fibers, and hemp, and other reinforcement materials will occur to those of skill in the art.

The support ribs 33 are a series of integrally formed ridges that traverse portions of the dryside and wetside surfaces of carrier plate 22, reinforcing carrier plate 22. The inherent material strength of the composite material used in carrier plate 22 combined with support ribs 33 reinforces door module 20, and thus strengthens the motor vehicle door body when mounted thereto.

Figures 5A, 5B:
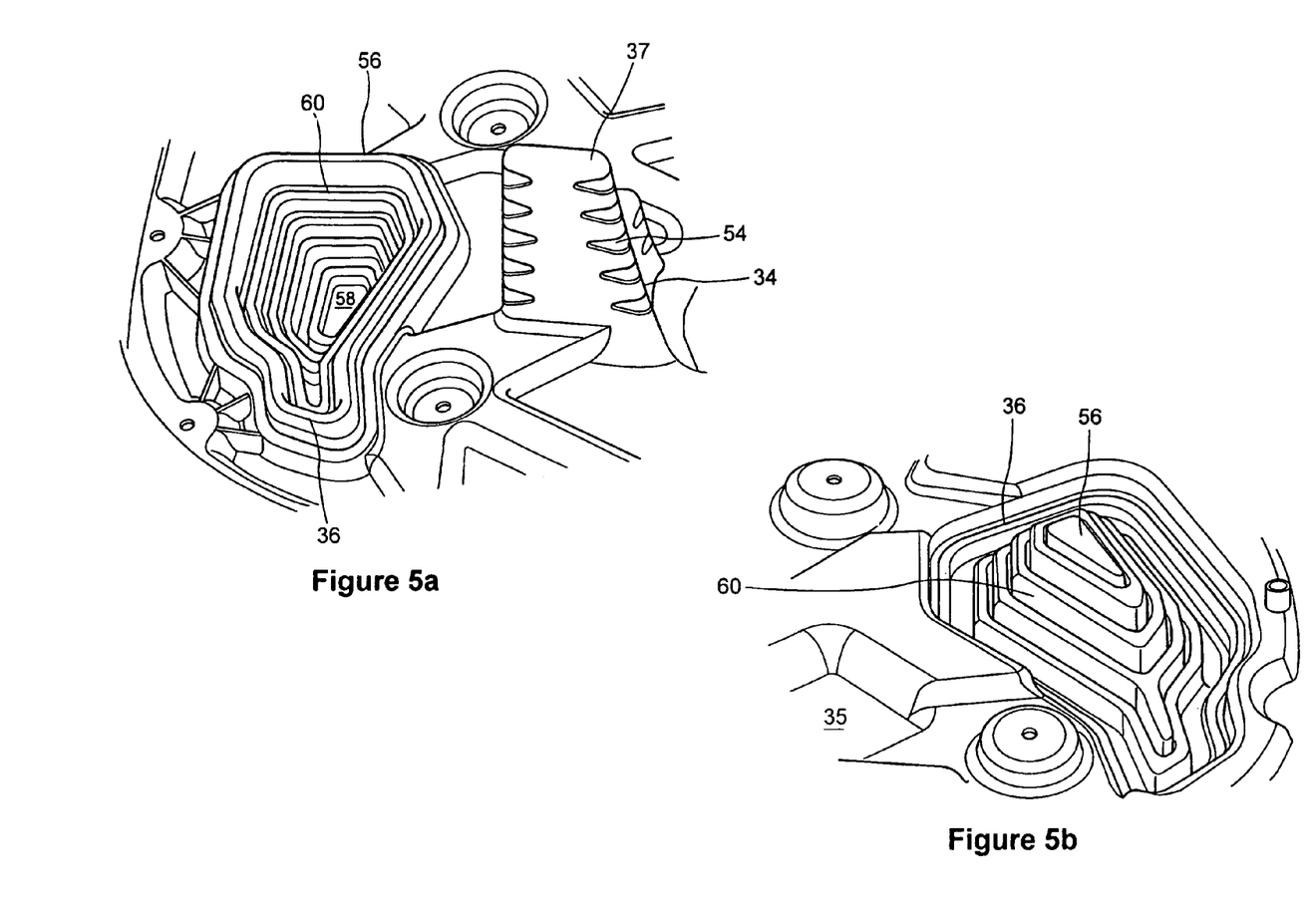
FIG. 5a is a detail view of an arm rest support and an energy absorbing block located on the structural door module shown in FIG. 3.
FIG. 5b is a detail view of the energy absorbing block located on the structural door module shown in FIG. 4.

Referring additionally to FIGS. 5a and 5b, arm rest support 34 is shown in greater detail. Arm rest support 34 is integrally formed with the carrier plate 22 and projects outwards generally perpendicularly from the dryside, forming an arm rest hollow 35 on the wetside surface of carrier plate 22. Arm rest support 34 is configured to mount a piece of armrest trim (not shown) on the interior of the motor vehicle door body. At least one fastener hole 37 is provided on the arm rest support 34 to secure the arm rest trim using a conventional fastener such as a screw, bolt or the like. The exact shape of arm rest support 34 can vary in order to accommodate differently shaped pieces of arm rest trim. Although the current embodiment uses only one arm rest support 34, it is contemplated that carrier plate 22 could provide two or more arm rest supports 34 to mount a piece of arm rest trim.

During a side-impact collision, arm rest support 34 is designed to collapse in upon itself, absorbing kinetic energy as arm rest support 34 pushes into the passenger compartment of the vehicle. As can be seen clearly in FIG. 5a, an array of beveled crumple zones 54 are provided spaced across the horizontal and vertical surface of arm rest support 34. In the presently illustrated embodiment, crumple zones 54 are diamond-shaped and straddle the corners between horizontal and vertical portions of arm rest support 34. Crumple zones 54 comprise thinner portions of arm rest support 34 that are weaker than the thicker, non-crumple zone portions. In the presently illustrated embodiment, the thickness of crumple zones 54 is 0.5 mm and the thickness of the non-crumple zone portions of arm rest support 34 is 2 mm. Dimensions can vary due to differing force requirements for different models of door modules. Alternatively, crumple zones 54 could be holes spaced across arm rest support 34. Crumple zones 54 are engineered to buckle under compression, but remain firm under tension and bending loads. When subjected to a violent compression force, crumple zones 54 buckle, causing arm rest support 34 to partially compact into hollow 35, rather than remain rigid. In the illustrated embodiment, arm rest support 34 requires a force of at least 2000 N maintained over a displacement of a minimum of 38 mm to begin collapsing. Other embodiments of the invention will compact under different loads. In addition to collapse upon impact, arm rest support 34 is capable of withstanding the rigors of conventional use. For example, when a heavy load is applied to the attached armrest (as would be caused by an occupant leaning on the armrest trim), the orientation of crumple zones 54 cause arm rest support 34 to buckle slightly rather than break. In the illustrated embodiment, arm rest support 34 is designed to support a load of up to approximately 100 kg. Arm rest support 34 is also designed to withstand a force of approximately 196 N (as would be caused by an occupant slamming the motor vehicle door shut or pushing the door open by the armrest trim).

As mentioned earlier, at least one integral energy absorption block 36 is formed from structural carrier plate 22. Energy absorption block 36 is structurally stiff across its length and width but designed to crumple upon perpendicular impact (i.e., perpendicular to the general plane of carrier plate 22), absorbing energy from the collision. As can be clearly seen in FIGS. 5a and 5b, energy absorption block 36 is molded into a series of concentric raised and lowered terraces 56 that first extend out from the dryside of carrier plate 22 and then recede into carrier plate 22 forming a hollow 58. Terraces 56 are spaced apart by contoured wall portions 60. Adjacent wall portions 60 are connected to each other by trough-shaped web portions 61. Web portions 61 are preferably thinner than the other portions of energy absorption block 36 as to tear more easily. Impact causes energy absorption block 36 to collapse inwards into hollow 58 prior to intruding into the passenger compartment of the vehicle. As each terrace 56 collapses into hollow 58, the material of carrier plate 22 shears along web portions 61. In the illustrated embodiment, energy absorbent block is required to maintain a force of at least 6000 N maintained over a minimum displacement of 55 mm to begin collapsing. Again, other embodiments of the invention having different dimensions and/or block geometry will collapse under different amounts of force.

Figure 6A:
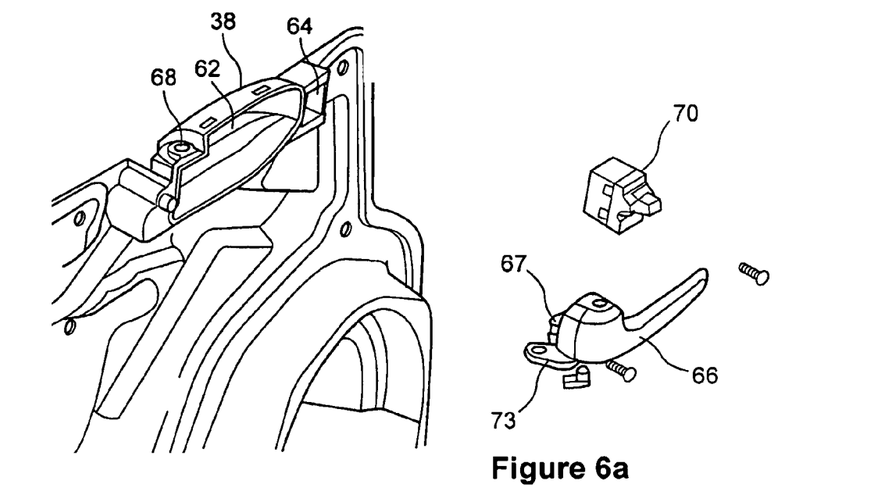
FIG. 6a is an exploded front detail view of an inner handle support located on the structural door module shown in FIG. 1.
Figure 6B:
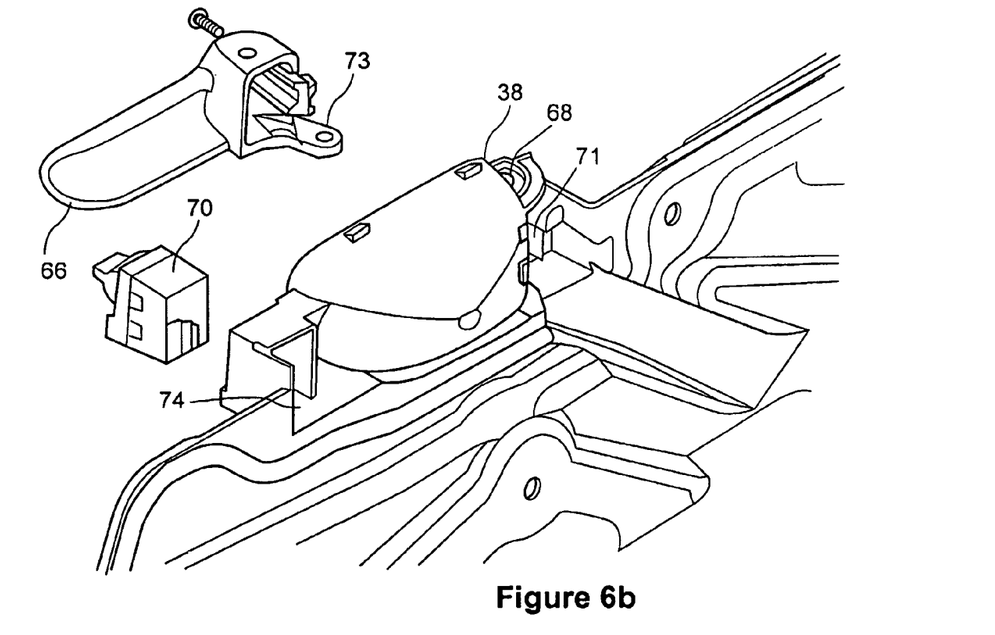
FIG. 6b is an exploded rear detail view of the back of the inner handle support located on the structural door module shown in FIG. 2.
Figure 7A:
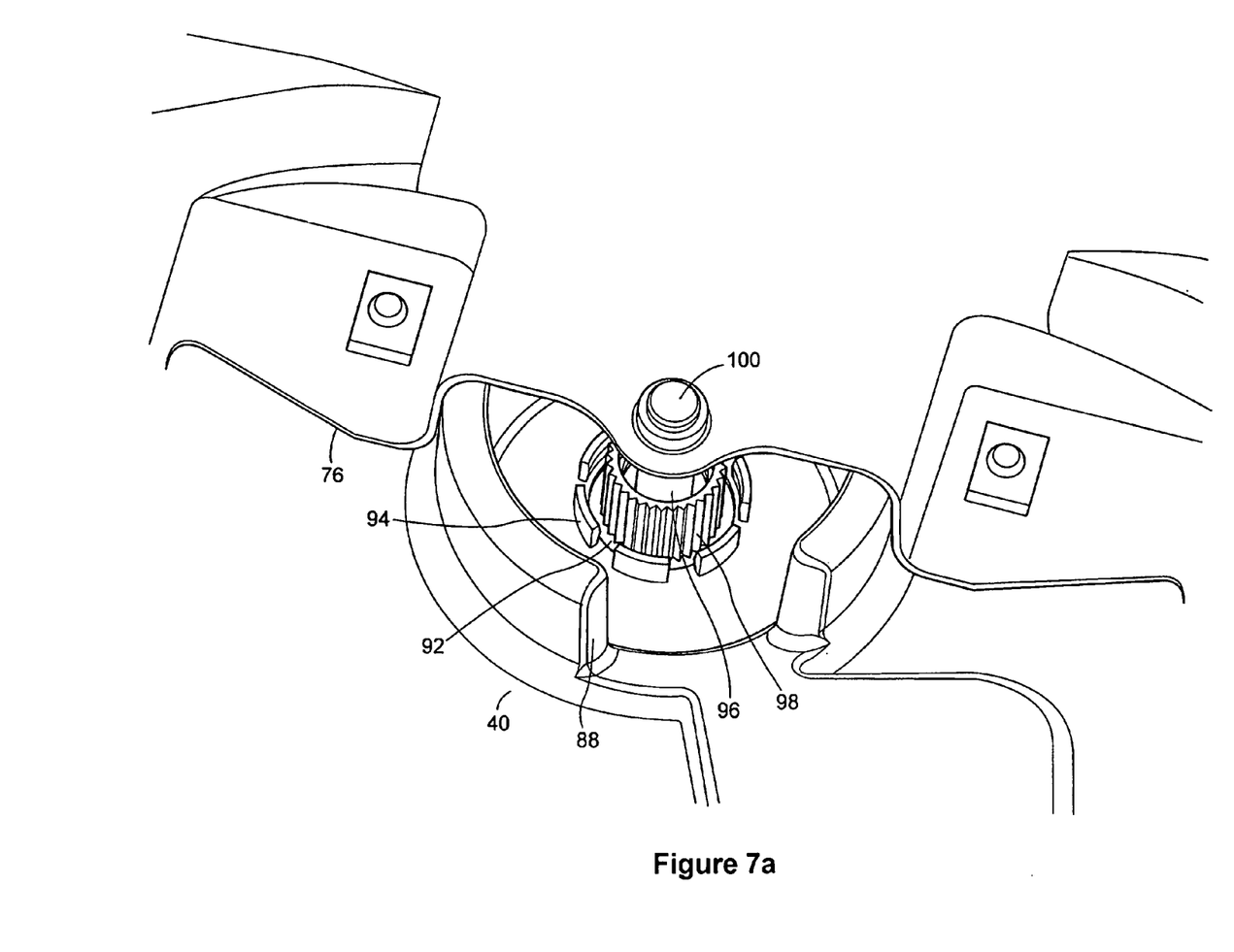
FIG. 7a is a front detail view of the cable drum housing located on the structural door module shown in FIG. 1.
Figure 7B:
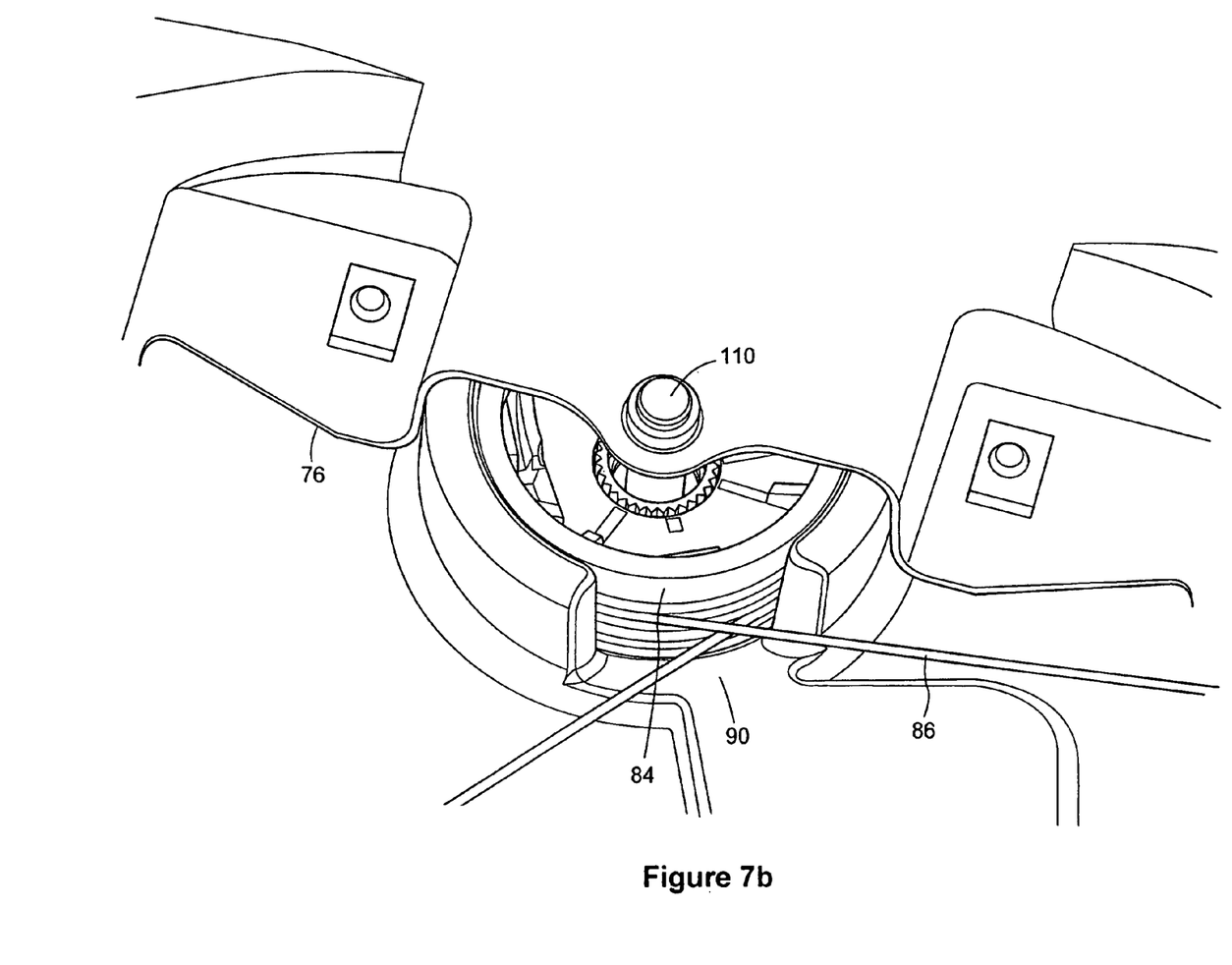
FIG. 7b is a front detail view of a portion of the mounted window regulator located on the structural door module shown in FIG. 3.

Referring additionally to FIGS. 6a and 6b, inner handle support 38 is shown in greater detail. Inner handle support 38 forms an integrally formed handle chamber 62 and lock switch chamber 64 that are both open to the dryside. Handle chamber 62 is adapted to receive a handle 66 and includes two opposing pivot holes 68 to pivotally mount handle 66 using pins, screws or the like. Handle 66 further includes a hinged mount 67 that secures handle 66 to inner handle support 38, while still permitting handle 66 to pivot within handle chamber 62, typically using a screw fastener. Lock switch chamber 64 is adapted to receive a door lock switch 70, which is held in place by detent tabs, screws or the like. Handle chamber 62 further includes a connecting rod passage 71 between the dryside and the wetside of carrier plate 22. An articulated rod 72a (not shown in FIGS. 6a and 6b) passes through rod passage 71 to connect a rod arm 73 extending from handle 66 to latch assembly 26 (described in greater detail below). Lock switch chamber 64 further includes electrical access passage 74. A cable from electrical harness assembly 32 (not shown in FIGS. 6a and 6b) passes through electrical access passage 74 and plugs into a socket (not shown) on door lock switch 70, and is described in greater detail below with reference to electrical harness assembly 32. Inner handle support 38 is further adapted to receive a fitted piece of trim (not shown) on the dryside that includes an opening to provide access to handle 66 in the passenger compartment. As such, the entire handle assembly 28 can be assembled as part of structural door module 20 prior to being mounted to a motor vehicle door body, reducing vehicle assembly time. Additionally, handle assembly 28 can be pre-tested before being mounted to a motor vehicle door body.

Referring back to FIGS. 1 to 4, in the illustrated embodiment, window regulator assembly 24 includes two rails 76, mounted in parallel at both ends to carrier plate 22. An opposing pulley 78 is rotatably mounted at each end of both rails 76. Each rail is further adapted to mount a lift member 80 in a slidable engagement. One of the rails 76 mounted to the carrier plate 22 has a flange situated to partially cover drum housing 40. A motor 82 is mounted to the dryside of carrier plate 22 and drives a cable drum 84. A cable 86 is threaded around the four opposing pulleys 78, cable drum 84 and connected to the two lift members 80.

As mentioned earlier, drum housing 40 is integrally formed on the wetside surface structural carrier plate 22. As can be more clearly seen from the detailed view of FIG. 7b, drum housing 40 receives cable drum 84 and includes a cylindrical sidewall 88. Cylindrical sidewall 88 contains a gap portion 90, allowing cables 86 to wrap around cable drum 84 and towards opposing pulleys 78 on the further rail 76. Centered in drum housing 40 is a shaft opening 92 (see FIG. 7A) that provides a passage between the dryside and wetside of carrier plate 22. A circular arrangement of tabs 94 allows an assembler to temporarily situate cable drum 84 in drum housing 40 prior to being permanently coupled to motor 82.

Motor 82 is coupled with a drive shaft 96 and situated so that drive shaft 96 passes through shaft opening 92. Gear teeth 98 on drive shaft 96 engage cable drum 84 so that it is held in place between the carrier plate 22 and the over-mounted flange on rail 76. Drive shaft 96 extends through and is freely rotatable within a shaft opening 100 in the over-mounted rail 76. A cable from electrical harness assembly 32 plugs into a socket (not shown in FIG. 7a or 7b) on motor 82, and is described in greater detail below with reference to electrical harness assembly 32. As such, the entire window regulator assembly 24 can be assembled on carrier plate 22 as part of structural door module 20, reducing vehicle assembly time. Additionally, window regulator assembly 24 can be pre-tested before being mounted to a motor vehicle door body.

As mentioned previously, a latch presenter 42 is integrally formed from an edge of structural carrier plate 22. As can be more clearly seen from FIG. 8, latch presenter 42 forms a box-like compartment 102 on the wetside surface of carrier plate 22. The sidewall of compartment 102 is open on one side to receive and mount latch assembly 26. A rod passage 103 in the opposing sidewall of compartment 94 allows articulated rod 72a to pass into compartment 102 and connect latch assembly 26 to rod arm 73. An articulated rod 72b also passes through rod passage 103 and terminates in a lock status indicator 105 (not shown in FIG. 8).

Figure 8:
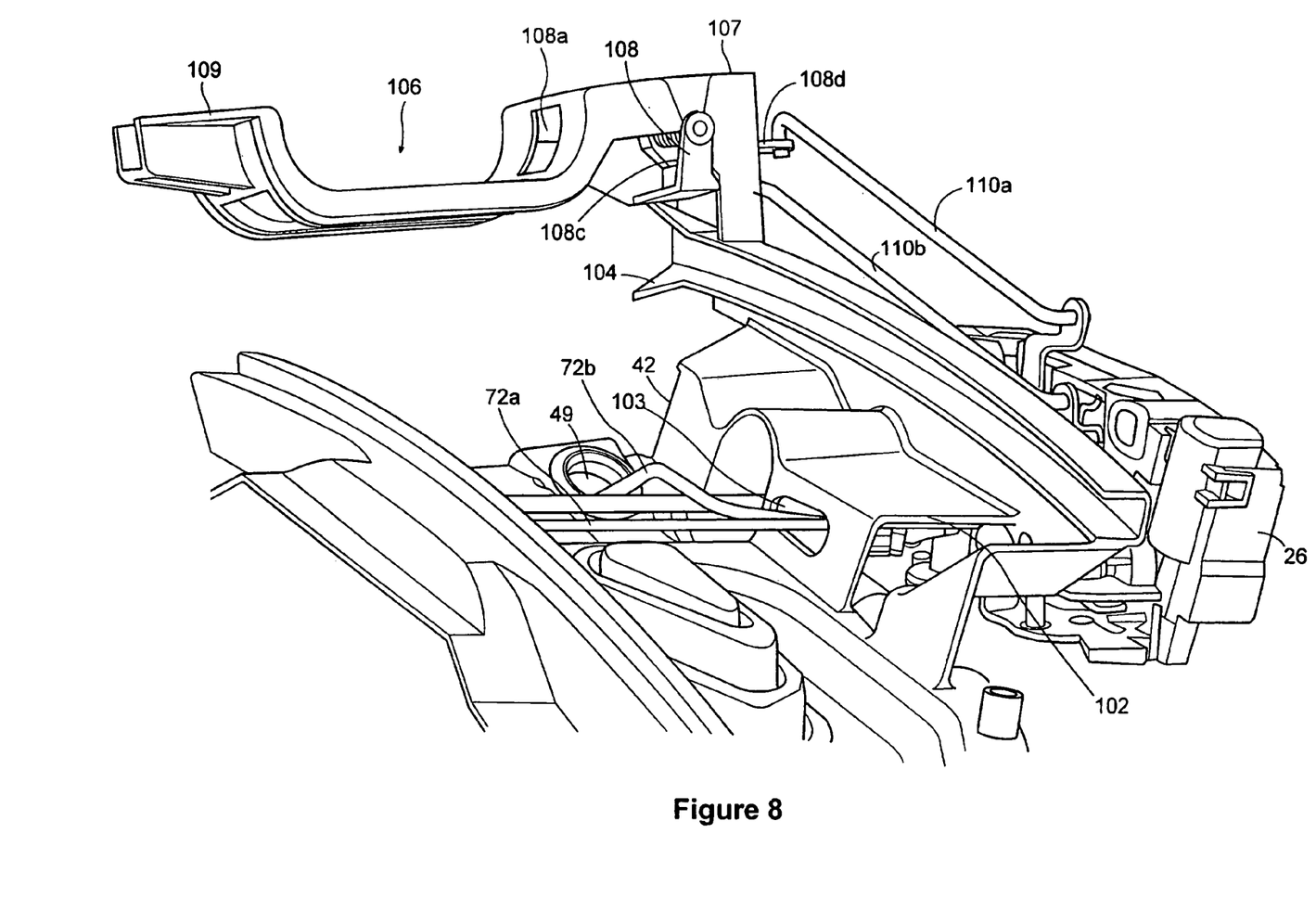
FIG. 8 is a front perspective view of a latch presenter located on the structural door module shown in FIG. 3.

A cable from electrical harness assembly 32 plugs into a socket (not shown) on latch assembly 26, and is described in greater detail below with reference to electrical harness assembly 32. As such, the entire latch assembly 26 can be assembled on carrier plate 22 and connected to handle assembly 28 as part of structural door module 20 prior to being mounted to a motor vehicle door body, reducing vehicle assembly time. Additionally, latch assembly 26 can be pre-tested before being mounted to a motor vehicle door body.

Extending out from the surface of latch presenter 42 and displaced away from the wetside surface of carrier plate 22 is an integrally formed glass channel 104. Glass channel 104 provides a C-shaped channel that runs generally parallel to rails 76 adapted to provide additional stabilization for a window glass (not shown) mounted to window regulator assembly 24. Preferably, weather stripping (not shown) is added to glass channel 104 to provide a water-tight seal around the window pane.

The carrier plate includes an integrally formed outside handle base 106 that extends substantially perpendicular to glass channel 104. Outside handle base 106 is exposed to the outer surface of the vehicle door by means of an opening (not shown) formed in the outer sheet metal panel of the motor vehicle door. Outside handle base 106 provides an linked end 107 which is contiguous with the glass run channel and a free end 109 intended to be fastened to the outer sheet metal layer of the vehicle door using screws or the like. The outside handle base 106 includes a cavity 108A enabling an outer door handle (not shown) to be inserted therethrough for connection to a U-shaped biased hinge mechanism 108 mounted to linked end 107. The outer door handle preferably seats in a feature 108C of the hinge mechanism but may be connected to the hinge mechanism 108 using other conventional means. The hinge mechanism 108 includes an arm 108d which swings as the U-shaped part of the hinge mechanism pivots in response to actuation of the outer door handle. The arm 108d is in turn connected to latch assembly 26 by a rod 110a which activates a latch outer door release lever. Rod 110b connects a door handle key cylinder (not shown) to the latch assembly, as known in the art per se.

Referring back to FIGS. 1 to 4, electrical harness assembly 32 includes a plurality of cables 112 originating from a face boot 114. Cables 112 provide signals and power to all the electrically-driven subsystems mounted to structural door carrier 20, including window regulator assembly 24, latch assembly 26, inner handle assembly 28 and speaker assembly 30. Each cable 112 ends in an electrical controller 116. Each electrical controller 116 is adapted to plug directly into a complementary socket on its designated subsystem. For example, electrical controller 116a plugs into a socket on motor 82 to provide power to window regulator assembly 24, electrical controller 116c plugs into a socket on latch assembly 26, electrical controller 116b plugs into a socket on door lock switch 70 to provide power to inner handle assembly 28, and electrical controller 116d plugs into a socket on speaker assembly 30. Other electrical controllers 116 can be provided to power other subsystems mounted to structural door module 20. By using electrical controllers 116 that plug directly into their designated subsystem, wiring time is minimized. In addition, each electrical controller 116 and complementary electrical socket can differ in shape from each other electrical controller 116-electrical socket pair as to prevent miswirings. Harness clips 44 on the surface of carrier plate 22 hold electrical cables 112 in place. Preferably, harness clips 44 are integrally formed from the surface of carrier plate 22 as to eliminate the need to separately mount harness clips 44 to carrier plate 22.

Figure 9:
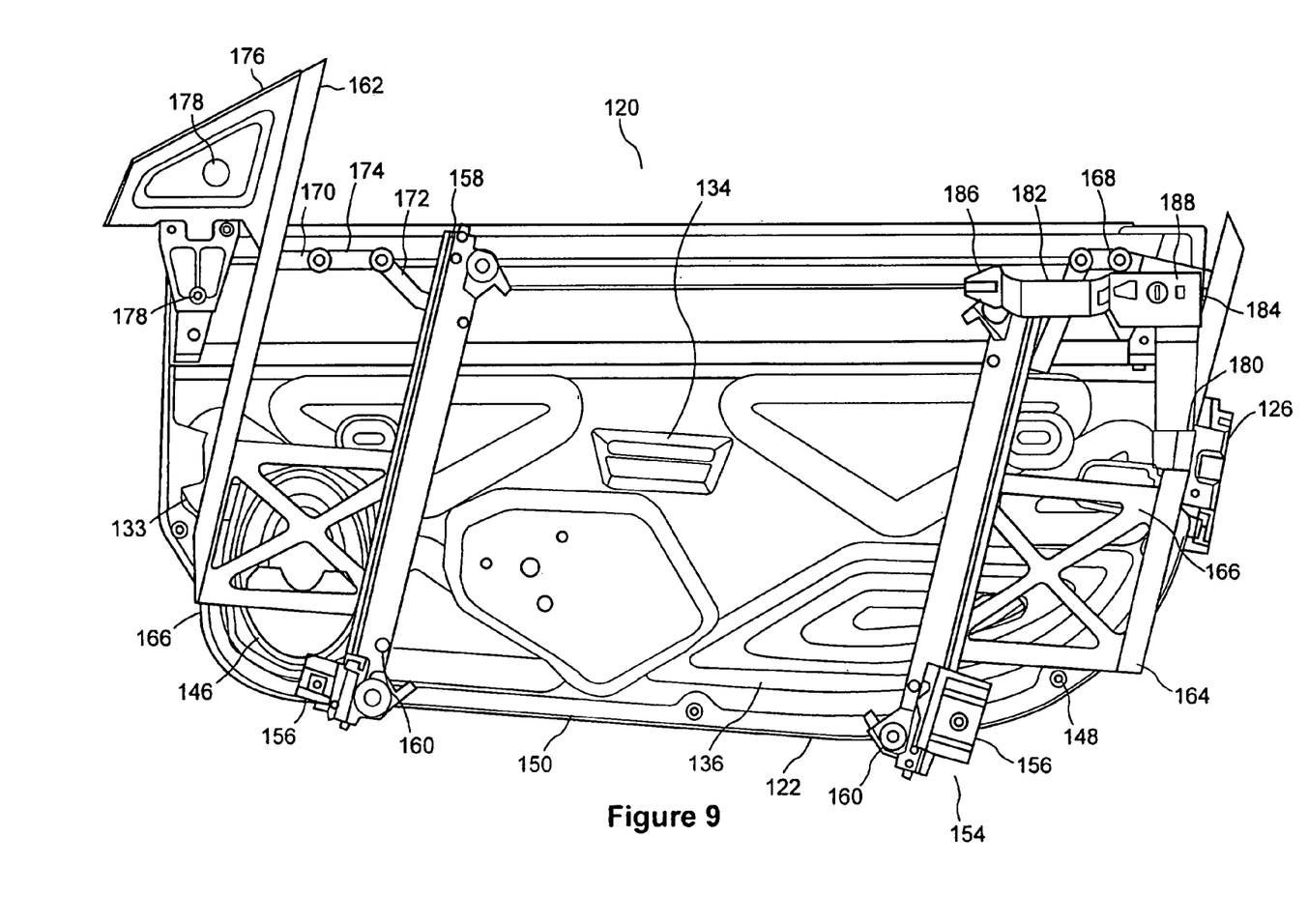
FIG. 9 is a front perspective view of a structural door module according to a second embodiment of the invention.
Figure 10:
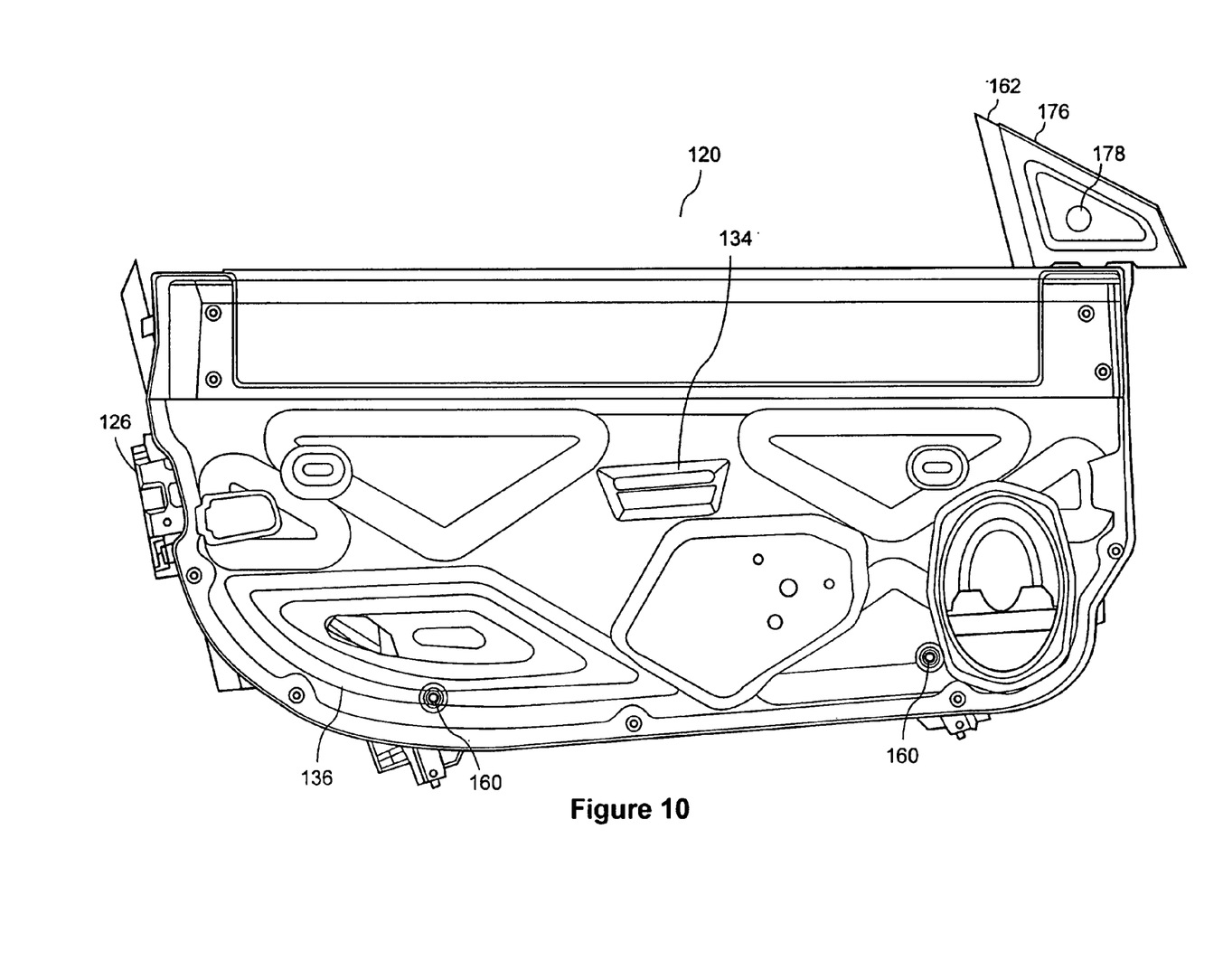
FIG. 10 is a rear perspective view of the structural door module shown in FIG. 9.

FIGS. 9 and 10 show a structural door module 120 that embodies a second aspect of the invention. The structural door module 120 is particularly useful for a convertible vehicle door and includes a carrier plate 122. Carrier plate 122 includes a number of integrally formed or molded components. Integrally formed components on carrier plate 122 include support ribs 133, an integral arm rest support 134, at least one integral energy absorption block 136, an integral inner handle support 138, harness clips 144, and speaker housing 146. A plurality of fastener holes 148 spaced apart around the surface of structural carrier plate 122 provide a means to attach structural carrier plate 122 to the convertible vehicle door body through the use of carriage bolts, screws or the like. Preferably, a water-sealing bead 150 is formed around the perimeter of carrier plate 22 on the wetside surface. The sealing bead 150 engages the inner wall of the convertible vehicle door body, providing a watertight seal for structural door module 120. Water sealing bead 150 can be integrally formed from carrier plate 122 or, alternatively, water sealing bead 150 can be affixed to carrier plate 122 as a foam adhesive or the like.

Figure 11:
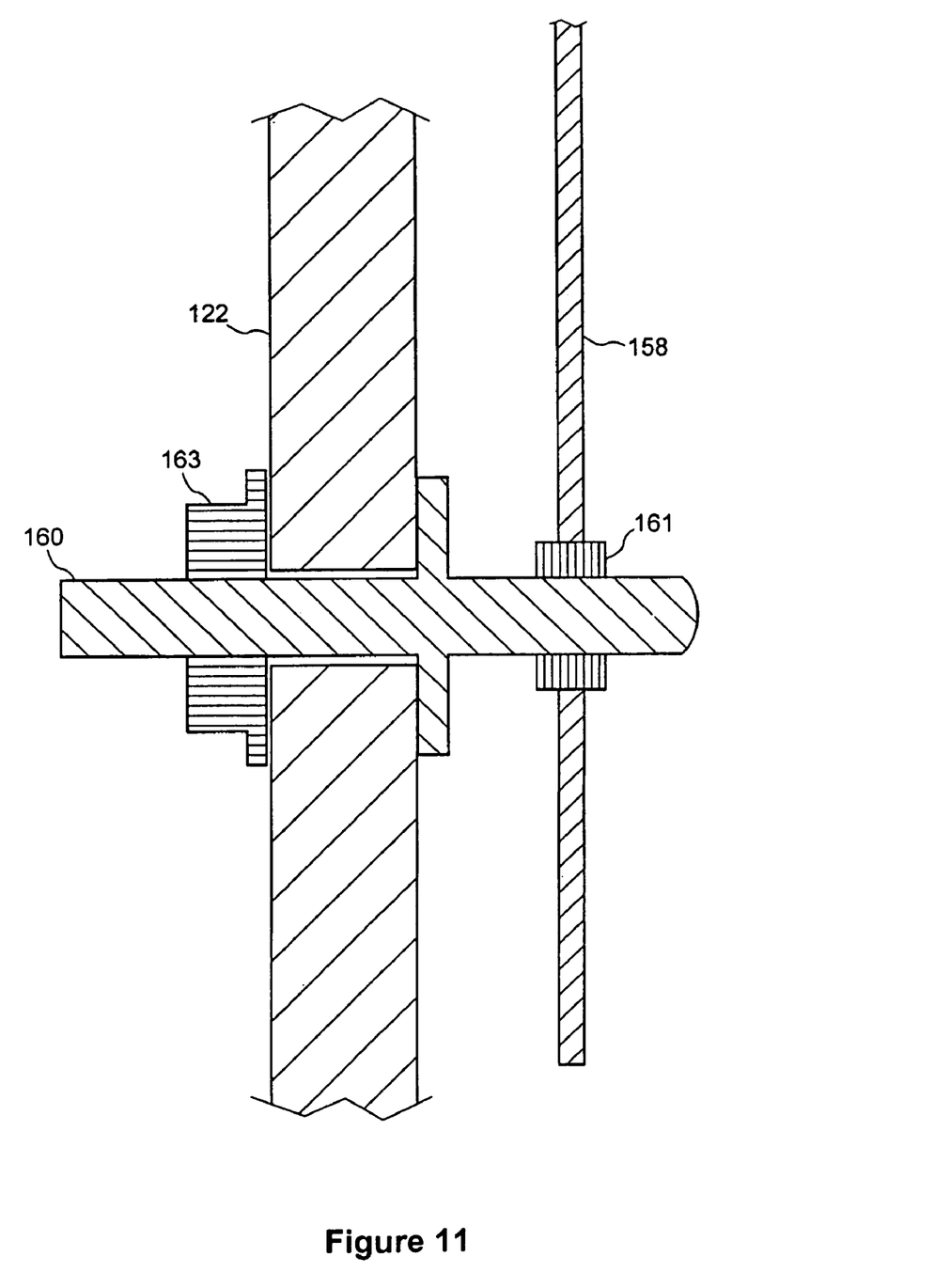
FIG. 11 is a cross-section of a portion of the structural door module shown in FIG. 9.

A window regulator assembly 154 is mounted to the wetside surface of carrier plate 122. Window regulator assembly 154 includes a pair of lift members 156 slidably mounted to parallel first and second rails 158. Each of first and second rails 158 is mounted to carrier plate 122 by a jack screw 160 secured near one end of first and second rails 158. Jack screws 160 provide for cross-car adjustment of the window glass. Referring additionally to FIG. 11, each of first and second rails 158 includes a locking nut 161 to securely mount jackscrew 160 to rail 159. Jack screws 160 extend through carrier plate 122 and are mounted to carrier plate 122 via an adjusting nut 163. By rotating adjusting nut 163 clockwise or counterclockwise, jackscrew 160 is displaced further towards either the dryside or the wetside, adjusting the positioning of the rail 158 relative to carrier plate 122. Thus, the position of a mounted window glass (not shown) can be easily adjusted. Each of the jackscrews 160 can be adjusted independently of the other, allowing for a more precise fit.

Referring back to FIGS. 9 and 10, a C-shaped front guide channel 162 and an opposing C-shaped rear guide channel 164 provide additional stability for a mounted window glass (not shown). An integrally formed bracket 166 on front guide channel 162 and rear guide channel 164 mounts front guide channel 162 and rear guide channel 164 to their respective first and second rail 158. Brackets 166 can be mounted to first and second rail 158 using clips, screws or other conventional mounting means. Each of front guide channel 162 and rear guide channel 164 are further mounted to their respective first and second rail 158 by a dual link bracket 168. Each dual link bracket 168 is comprised of a first portion 170, a second portion 172 and a middle portion 174. First portion 170 is integrally formed at one end from one of front guide channel 162 and rear guide channel 164 and extends at a perpendicular thereto. Second portion 172 is rotatably connected at a one end to one of first and second rails 158. Middle portion 174 is rotatably connected at both ends to first portion 170 and second portion 172. Given the adjustable mounting of first and second rails 158 on jack screws 160, combined with the pivotal mounting of the dual link brackets 168, the position of a window glass can be shifted around in a convertible door frame.

A mirror flag stem 176 is integrally formed from one end of front guide channel 162. Mirror flag stem 176 is adapted to receive a side mirror assembly (not shown) on the exterior of the motor vehicle door body. Mirror access holes 178 provide an opening to interconnect the mirror assembly with electrical cables 112 (for mirror assemblies that are electrically steerable or heated or to an actuating rod (for mirror assemblies that are manually steerable). As such, the entire mirror assembly can be assembled and aligned as part of structural door module 120 prior to being mounted to a motor vehicle door body, reducing vehicle assembly time. Additionally, the mirror assembly can be pre-tested before being mounted to a motor vehicle door body.

Figure 12:
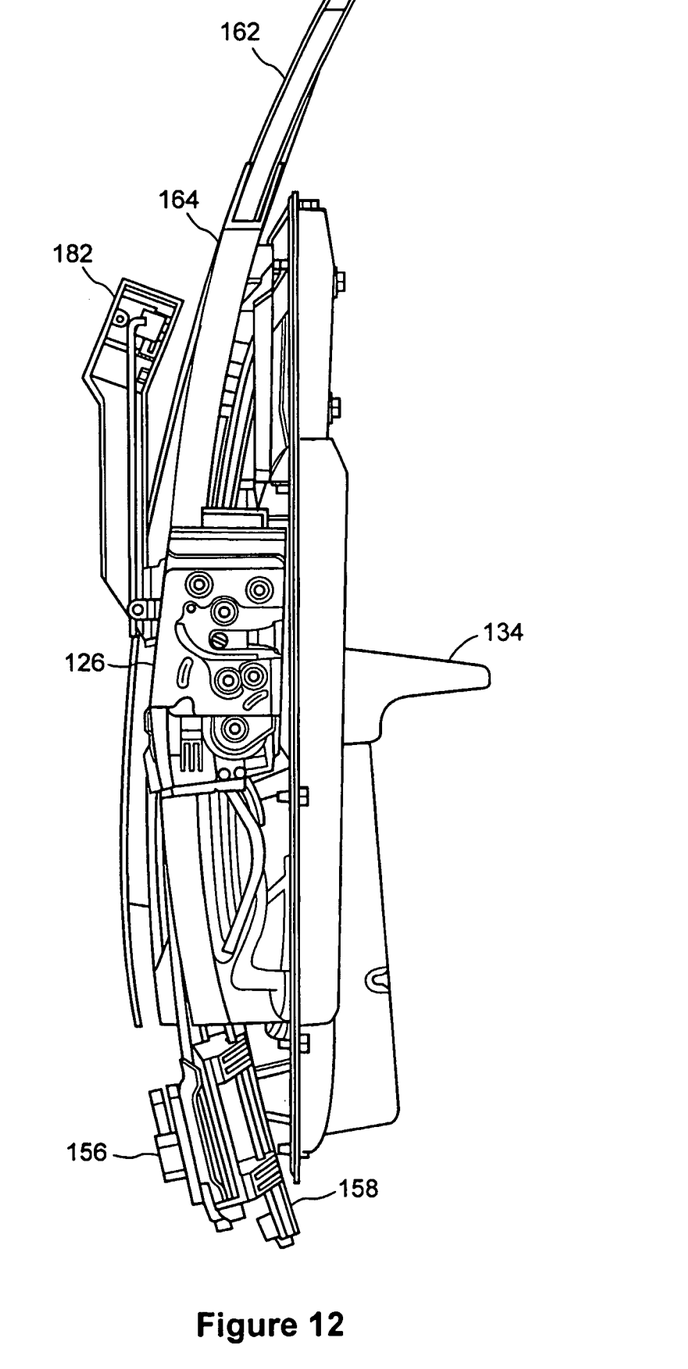
FIG. 12 is a side perspective view of the structural door module shown in FIG. 9.
Figure 13:
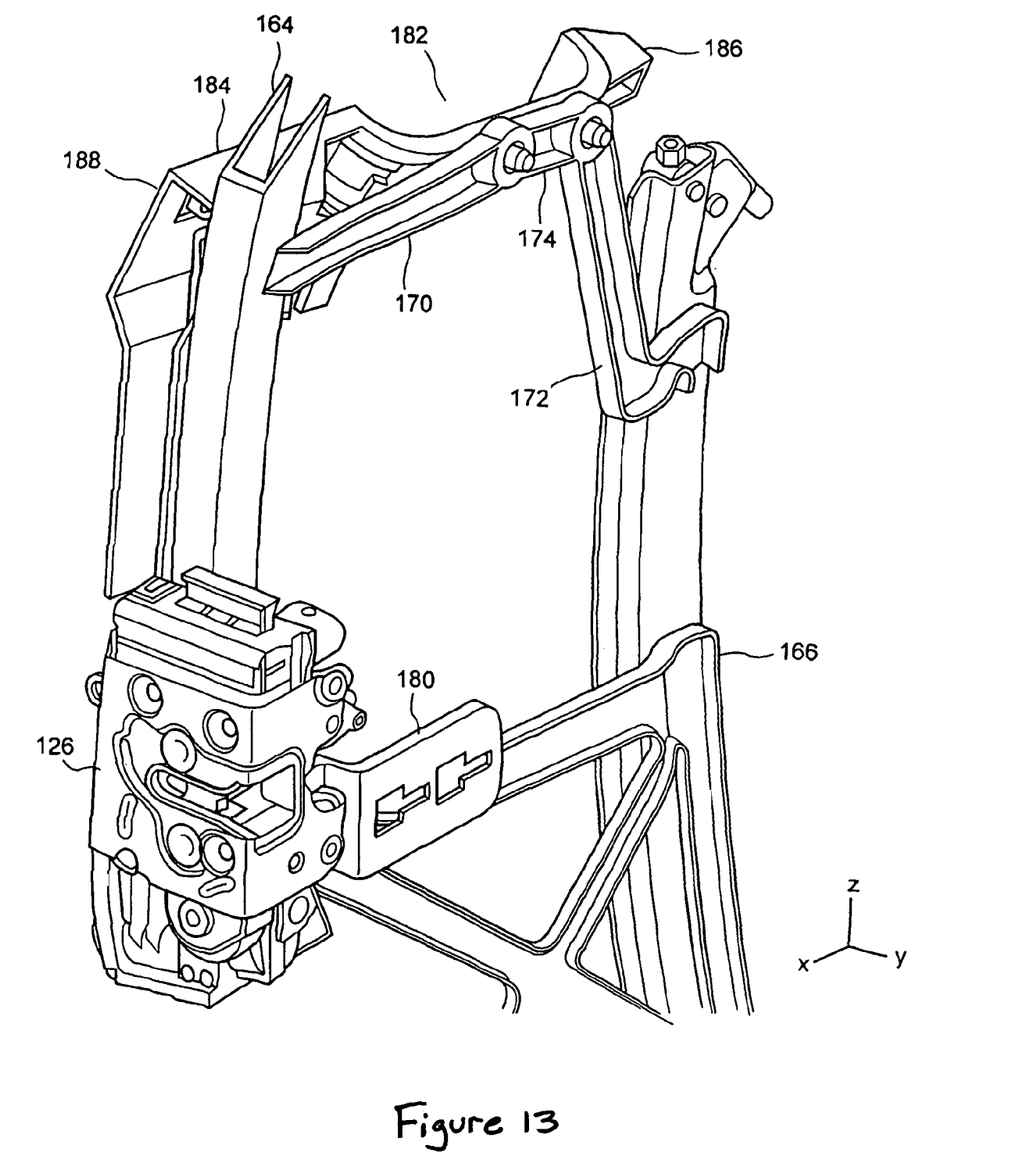
FIG. 13 is a detail view of a portion of a window regulator located on the structural door module shown in FIG. 9.

Referring additionally to FIGS. 12 and 13, a latch presenter 180 is mounted to rear glass guide channel 164 near bracket 166. Latch presenter 180 can be mounted to rear guide channel 164 using clips, screws or other conventional mounting means. A latch assembly 126 is mounted to latch presenter 180. Once window regulator assembly 154 is mounted to carrier plate 122, latch assembly 126 can be interconnected to the inner and outer door handles (not shown) and electrical cables 112 (not shown), reducing vehicle assembly time. Additionally, latch assembly 126 can be pre-tested before being mounted to a motor vehicle door body.

An outside handle base 182 is formed from latch presenter 180. Outside handle base 182 is adapted to pass through an opening in the motor vehicle door body (not shown) and to be exposed to the outer surface of the vehicle. Outside handle base 182 provides an attached end 184 and a free end 186. A hinge mount 188 is fitted around attached end 184. An outer door handle (not shown) complementary to outside handle base 182 can be pivotally mounted to hinge mount 188 using conventional means. Hinge mount 188 connects to latch assembly 126 by a pair of outer articulating rods 190 (not shown).

The above-described embodiments of the invention are intended to be examples of the present invention and alterations and modifications may be effected thereto, by those of skill in the art, without departing from the spirit of the invention.

What is claimed is:

1. A structural door module for a motor vehicle door body, comprising,
    a carrier plate forming a first and second surface;
    a plurality of door hardware components mounted to at least one of the first and second surface in a pre-configured orientation;
    an arm rest support integrally formed from the first and second surface and extending out from the first surface of the carrier plate and forming a hollow in the second surface, said arm rest support including an array of crumple zones formed in the first and second surface and spaced apart around the arm rest support so that the arm rest support collapses into the hollow when subjected to compression forces greater than a predefined force; and
    an energy absorption block integrally formed from the first and second surfaces of the carrier plate, said energy absorption block including a plurality of terraced portions spaced apart by wall portions between the first and second surfaces and arranged so that the plurality of terraced portions connected by the wall portions form a hollow on the first surface of the carrier plate, and at least one of the terraced portions collapse into the hollow in an opposite direction from that of the arm rest support when subjected to compression forces greater than a predefined force.

2. The structural door module of claim 1, wherein the crumple zones are thinner portions of the arm rest support than the non-crumple zone portions of the arm rest support.

3. The structural door module of claim 1, wherein the crumple zones are holes extending between the first surface and the second surface.

4. The structural door module of claim 1, further including a handle support integrally formed from the carrier plate, the handle support providing a cavity to receive a door handle assembly on the first surface.

5. The structural door module of claim 4, wherein the door handle assembly is mounted to the handle support prior to the door module being mounted to the motor vehicle door.

6. The structural door module of claim 5, wherein a latch assembly is mounted to the carrier plate and the door handle assembly is connected to the latch assembly prior to the door module being mounted to the motor vehicle door.

* * * * *